US008316095B1

(12) United States Patent
Wheeler, Jr. et al.

(10) Patent No.: US 8,316,095 B1
(45) Date of Patent: *Nov. 20, 2012

(54) COMPUTER-IMPLEMENTED SYSTEM AND METHOD FOR FACILITATING CONVERSATION WITHIN A GROUP THROUGH HETEROGENEOUS MESSAGE DELIVERY

(76) Inventors: Roland E. Wheeler, Jr., Wenatchee, WA (US); Shad Wheeler, Liberty Lake, WA (US); Richard Nugen, Spokane, WA (US)

( * ) Notice: Subject to any disclaimer, the term of this patent is extended or adjusted under 35 U.S.C. 154(b) by 200 days.

This patent is subject to a terminal disclaimer.

(21) Appl. No.: 12/795,558

(22) Filed: Jun. 7, 2010

Related U.S. Application Data

(63) Continuation of application No. 11/524,722, filed on Sep. 20, 2006, now Pat. No. 7,734,705.

(60) Provisional application No. 60/815,792, filed on Jun. 21, 2006.

(51) Int. Cl.
*G06F 15/16* (2006.01)
(52) U.S. Cl. ........................................ 709/206; 709/230
(58) Field of Classification Search .................. 709/206, 709/230
See application file for complete search history.

(56) References Cited

U.S. PATENT DOCUMENTS

| 6,430,604 B1 | 8/2002 | Ogle et al. |
| 6,549,937 B1 | 4/2003 | Auerbach et al. |
| 6,654,790 B2 | 11/2003 | Ogle et al. |
| 6,912,564 B1 | 6/2005 | Appelman et al. |
| 6,993,555 B2 | 1/2006 | Kay et al. |

OTHER PUBLICATIONS

W.R. Stevens, "TCP/IP Illustrated," vol. 1, Ch.1 et seq., Addison-Wesley (1994).

*Primary Examiner* — Creighton Smith
(74) *Attorney, Agent, or Firm* — Patrick J. S. Inouye

(57) ABSTRACT

A computer-implemented system and method for facilitating conversation within a group through heterogeneous message delivery is provided. A conversation thread including messages shared by recipients collectively formed into a group is identified. The messages from one recipient are queued in an intermediate format pending delivery through type-specific message interfaces to the other recipients. A message type corresponding to each other recipient is determined. An identifier is formatted and each message's content is structured from the intermediate format into the message type for the other recipients. The delivery of each message within the group is managed. First, the message is sent to the other recipients via the message interface corresponding to the message type of the other recipient. The delivery of the message is tracked by monitoring an acknowledgement of a receipt of the message. Last, an alternate message type is selected upon non-acknowledgment of message receipt by the other recipient.

20 Claims, 16 Drawing Sheets

100

230

240

COMPUTER-IMPLEMENTED SYSTEM AND METHOD FOR FACILITATING CONVERSATION WITHIN A GROUP THROUGH HETEROGENEOUS MESSAGE DELIVERY

CROSS-REFERENCE TO RELATED APPLICATION

This patent application is a continuation of U.S. patent application Ser. No. 11/524,722, filed Sep. 20, 2006, now U.S. Pat. No. 7,734,705, issued Jun. 8, 2010, which claims priority from U.S. Provisional Patent Application Ser. No. 60/815,792, filed Jun. 21, 2006, expired, the priority filing dates of which are claimed, and the disclosures of which are incorporated by reference.

FIELD

The invention relates in general to electronic messaging and, specifically, to a computer-implemented system and method for facilitating conversation within a group through heterogeneous message delivery.

BACKGROUND

Currently, a wide range of communications platforms and messaging options provide an increasing number of ways to stay in touch. Communications platforms run the gamut from conventional desktop personal computers to Web browser-enabled third generation ("3G") mobile telephones, which offer an equally broad range of messaging options, including email, instant messaging, text messaging, Web logs (Blogs), and digital voice, to name a few. New communications platforms and messaging options continue to evolve.

In particular, wireless devices have redefined interpersonal communications by providing a new plateau of availability and immediacy for message exchange. Mobile telephones, for instance, are widely used in place of conventional wired telephones. Additionally, in addition to providing basic voice communications, the capabilities of mobile telephones, as well as other types of wireless devices, have expanded to textual, visual, and other forms of digital data.

Nonetheless, wireless devices are only effective when service is available to subscribers. Physical limits can constrain coverage area, including range and signal strength. As well, practical limits, such as having a valid subscriber account, personal security needs, and social norms, can further restrict availability, such as in a movie theater where mobile telephone usage is strongly discouraged. Moreover, even where service is available, wireless devices fail if the subscriber does not answer.

Unanswered communications present a dilemma if immediate acknowledgement of the receipt of a message is needed. A caller must decide between trying to contact the recipient by another means of communication and risk further unanswered calls, or trying again at a later time. Thus, knowing message delivery status can be helpful, for instance, when the message is sent via an alternate means due to a failure or extended delay of the primary message delivery means to avoid further time wasted on re-attempts at delivery.

In addition to tracking message delivery, a single thread of "conversation" could conceivably take on different forms of messaging, such as voice, text, and email. While the conversation thread reflects a single communicative exchange, the divergence of messaging options can lead to a lack of synchrony. For example, a voice message sent in reply to a text message may be lost or not properly noted, leading to lost contacts or duplicative replies. Conventional approaches to providing multiple messaging means fail to satisfactorily queue, track, and synchronize message delivery.

For instance, U.S. Pat. Nos. 6,430,604 and 6,654,790 teach an Instant Messaging System (IMS) that allows users to register one or more alternative message delivery mechanisms, such as pagers, cellular telephones, and email. The alternative message delivery mechanisms can include constraints. If a user is not currently logged on to the system, the IMS can deliver a message using a suitable alternative, provided all constraints are satisfied. The IMS also allows a sender to determine a message recipient's availability. However, undelivered messages are not enqueued and the sender is only notified if the message cannot be delivered through the IMS or one of the alternative mechanisms.

U.S. Pat. No. 6,912,564 teaches a communications system that includes an instant messaging network (IMN) and an email gateway that are interconnected via a configuring network. The IMN can determine a user's availability. The configuring network is dedicated to automatically configuring instant messaging communication between email senders and recipients. The configuring network can send redirection commands to a recipient based on the capability of a sender to receive an instant message or the capability of another recipient of the email to receive an instant message.

U.S. Pat. No. 6,993,555 teaches interactively responding to queries from instant messaging users. Each query is processed and an answer is generated, which is formatted and returned to the user as an instant message, or via another route specified by the user. Instant messaging query responses originate with a query response system, rather than from a user to another user.

Finally, U.S. Pat. No. 6,549,937 teaches a user interface coupled to a conversion platform via an API, which allows multi-protocol messaging communication. The conversion platform translates messages and commands from a standard protocol into individual service provider messaging formats and protocols. Delivered messages are neither threaded nor updated.

Therefore, there is a need for providing a versatile communications platform with multiple message type support and transparent interoperability. Preferably, such a platform would provide generic message composition translatable into one of several available messaging formats, and the platform will monitor and automatically deliver the message in those messaging types that the recipient accepts.

SUMMARY

A "shadowbox" framework transparently operates within a set of intermediate network protocol layers to enable heterogeneous messaging between subscribing users. Incoming messages are converted through a messaging format-specific interface and aggregated into an intermediate protocol pending message delivery. Communications are proxied through the shadowbox framework, which exports an application programming interface (API) that communicates with end user applications, such as Web browsers and email clients. A set of handling rules specify alternate means of message delivery. Pending messages remain enqueued until delivery is complete with continued tracking and synchronization. Reply messages and other messages that are part of an active communication thread are parlayed through the shadowbox framework, which converts the messages into the intermediate protocol and recipient-specified messaging formats.

One embodiment provides a system and method for facilitating conversation within a group through heterogeneous message delivery. A message is queued. The message includes an identifier and content in intermediate format pending delivery through type-specific message interfaces. The delivery of the message to a recipient is managed with the message cast into one of a plurality of message types. The identifier is formatted and the content of the message is structured from the intermediate format into one such message type for the recipient. The message is sent to the recipient via the message interface corresponding to the selected message type. The delivery of the message is tracked by monitoring an acknowledgement of a receipt of the message by the recipient. An alternate message type available is selected upon non-acknowledgment of message receipt.

A further embodiment provides a computer-implemented system and method for facilitating conversation within a group through heterogeneous message delivery. A conversation thread that includes a plurality of messages and that is shared by a plurality of recipients who are collectively formed into a group is identified. For each recipient in the group, the messages from one such recipient are queued in an intermediate format pending delivery through type-specific message interfaces to each of the other recipients of the conversation thread. A message type corresponding to each of the other recipients is determined. An identifier is formatted and the content of each message are structured from the intermediate format into the message type for each of the other recipients. The delivery of each message within the group is managed. First, the message is sent to each of the other recipients via the message interface corresponding to the message type of the other such recipient. The delivery of the message is tracked by monitoring an acknowledgement of a receipt of the message by the other such recipient. Last, an alternate message type is selected upon non-acknowledgment of message receipt by the other such recipient.

Still other embodiments will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Environment

Interpersonal communications are as much challenged by the type of communications device used, as by the particular type of messaging employed. The continually increasing number of messaging options has outpaced the interoperability of the communications devices and message types, leaving the onus on the sender to find an appropriate solution for contacting a recipient.

Figure 1:
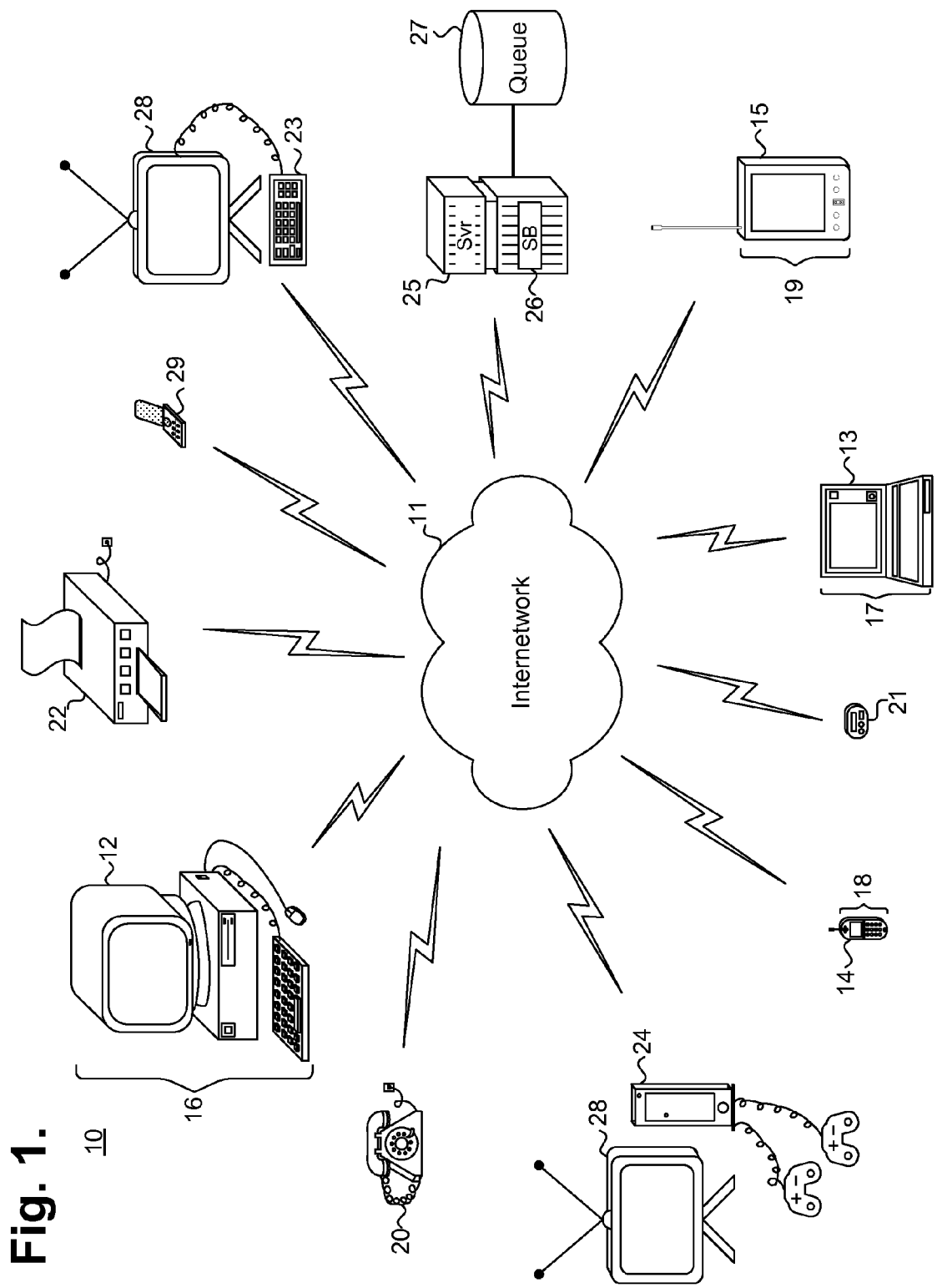
FIG. 1 is a block diagram showing, by way of example, an heterogeneous electronic data communications environment.

FIG. 1 is a block diagram showing, by way of example, a heterogeneous electronic data communications environment 10. The environment 10 includes a range of physical communications devices that each support one or more different types of messaging options. The communications devices are commonly interconnected over an internetwork 11, such as the Internet, and can include other forms of network interconnectivity, including modem-to-modem interconnections, with wired and wireless interfaces. Other network configurations and topologies are possible.

The communications devices include individual computing systems, communication devices, and consumer-grade equipment, such as gaming consoles and other personal electronic devices that provide communications interfaces and capabilities. For example, a personal computer system 12, which includes a user interface 16 with input and output means, can offer email, instant messaging, text messaging, Blog, Real Simple Syndication (RSS), audio data and video data messaging types. A notebook computer 13 with a similar user interface 17 can provide the same types of messaging options, but in a portable and mobile package. Increasingly, mobile telephones 14 and personal data assistants (PDAs) 15, respectively having more limited user interfaces 18, 19, offer a growing range of messaging type support, as well as a new generation of personal and business communications devices 29. Similarly, communications consoles 23, such as the WebTV, and gaming consoles 24, such as the Xbox, both licensed by Microsoft Corporation, Redmond, Wash., use existing infrastructure, such as television sets 28, to present a hybrid user interface, and can offer a further platform for exchanging messages. Receive-only devices, such as pagers 21 and facsimile machines 22, respectively allow unidirectional message communication, which requires replies to be sent via a different communications device and messaging format. Finally, legacy devices, such as conventional telephones 20, can interface into the electronic data communications environment 10 by converting analog data into digital data that can be exchanged over an internetwork 11. Other types of physical communication devices and messaging types are possible.

Figure 2:
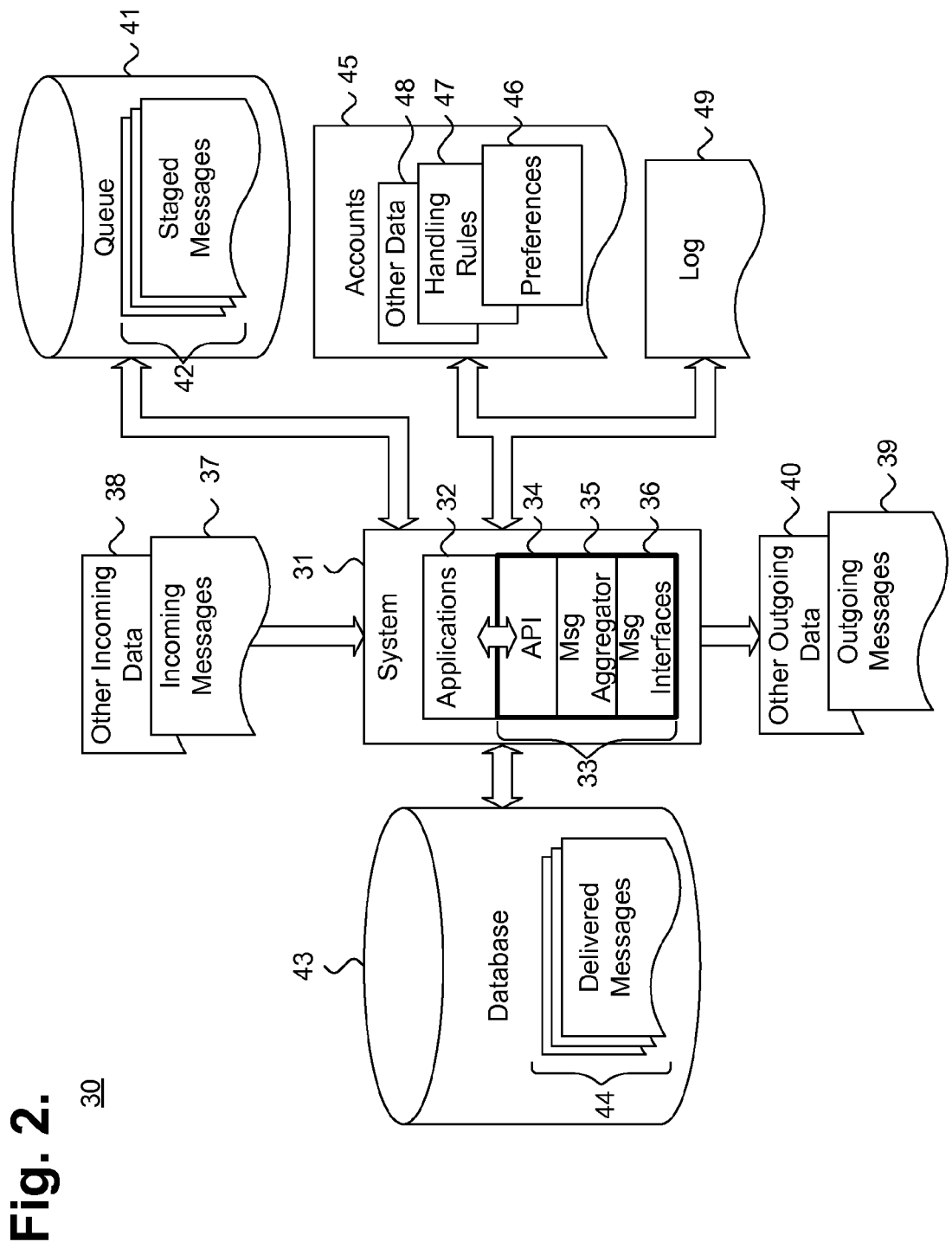
FIG. 2 is a functional block diagram showing a system, by way of example, for facilitating conversation within a group through heterogeneous message delivery, in accordance with one embodiment.

The various communications devices are logically integrated through a centralized server 25 that stages pending and undelivered messages in a queue 27 and actively manages the messages through a shadowbox framework 26, as further described below with reference to FIG. 2. The shadowbox framework 26 enables a sender and one or more recipients to transact a conversation using a messaging type of their own choosing and without having to know the particular messaging type preferred by the other party. Equivalent server functionality can also be provided by a personal computer system 12, notebook computer 13, communications console 23, and gaming console 24 through a shadowbox framework (not shown).

Preferably, the centralized server 25 is a server-grade computing platform configured as a uni-, multi-, or distributed processing system. Additionally, the server 25, personal computer 12, and notebook computer 13 are programmable computing devices that respectively execute software programs and include components conventionally found in computing devices, such as, for example, a central processing unit, memory, network interface, persistent storage, and interconnection components.

System

Fundamentally, the shadowbox framework 26 transparently manages disparate messaging types between communicating parties. The particular hardware necessary to support the shadowbox framework 26 will depend upon message volume, available individual computing systems and communication devices, system capabilities and interfaces, and similar factors. In one embodiment, the shadowbox framework 26 can be made available to users through a centralized server 25 to provide a widely-available and centralized communications hub. In further embodiments, local or "personal" versions of the shadowbox framework 26 can be implemented on consumer-grade equipment, such as described above with reference to FIG. 1.

Generically, each system that provides a shadowbox framework 26 provides a common set of functional components. FIG. 2 is a functional block diagram showing a system 30, by way of example, for facilitating conversation within a group through heterogeneous message delivery, in accordance with one embodiment. A system 31 executes a sequence of programmed process steps, such as described below beginning with reference to FIG. 7, implemented, for instance, on a programmed digital computer or communications device.

The system 31 includes a queue 41 and database 43. Staged messages 42 that are in transit and yet to be delivered are temporarily stored in the queue 41. Delivered messages 44 are stored in the database 43, but can be deleted if a receiving application declines delivered message storage.

Structurally, the system 31 includes applications 32 and the shadowbox framework 33. The applications 32 include system utilities and end user-operable programs (not shown). The shadowbox framework 33 includes an application programming interface (API) 34, message aggregator 35, and message interfaces 36. Other server modules and components are possible The shadowbox framework 33 manages the processing of messages, including message queuing, tracking, and synchronization. The API 34 provides an exportable interface of the messages between the applications 32 and the shadowbox framework 33. The message aggregator 35 receives incoming messages 37 and other incoming data 38 through a corresponding message interface 36, that converts each incoming message 37 into an intermediate protocol for management by the shadowbox framework 33, as further described below with reference to FIG. 3.

To manage messages, the shadowbox framework 33 references a set of individual user accounts 45, which stores user preferences 46, handling rules 47, and other data 48, such as calendar and schedule information. The preferences 46 define user identifier data and program options. The handling rules 47 specify the order of application of successive messaging types in the event of a condition occurrence, such as message non-delivery, encountered when message delivery is unsuccessfully attempted. In turn, the shadowbox framework 33 manages the sending of outgoing messages 39 and other outgoing data 40 that is similarly processed by the message aggregator 35 through the corresponding message interfaces 36. In a further embodiment, the delivery and, if necessary, handling of message exchange is chronicled in a log 49 maintained by the shadowbox framework 33.

The shadowbox framework 33 also provides acknowledgement or non-acknowledgement of message delivery from a recipient to a sender. The sender and recipient are generally the communications device to which the message is relayed. However, the acknowledgment or non-acknowledgement can be the result of manual user action or an automated response generated by the device to signify that the message was perceived. Other server functions are possible.

Heterogeneous Protocol Layers

Figure 3:
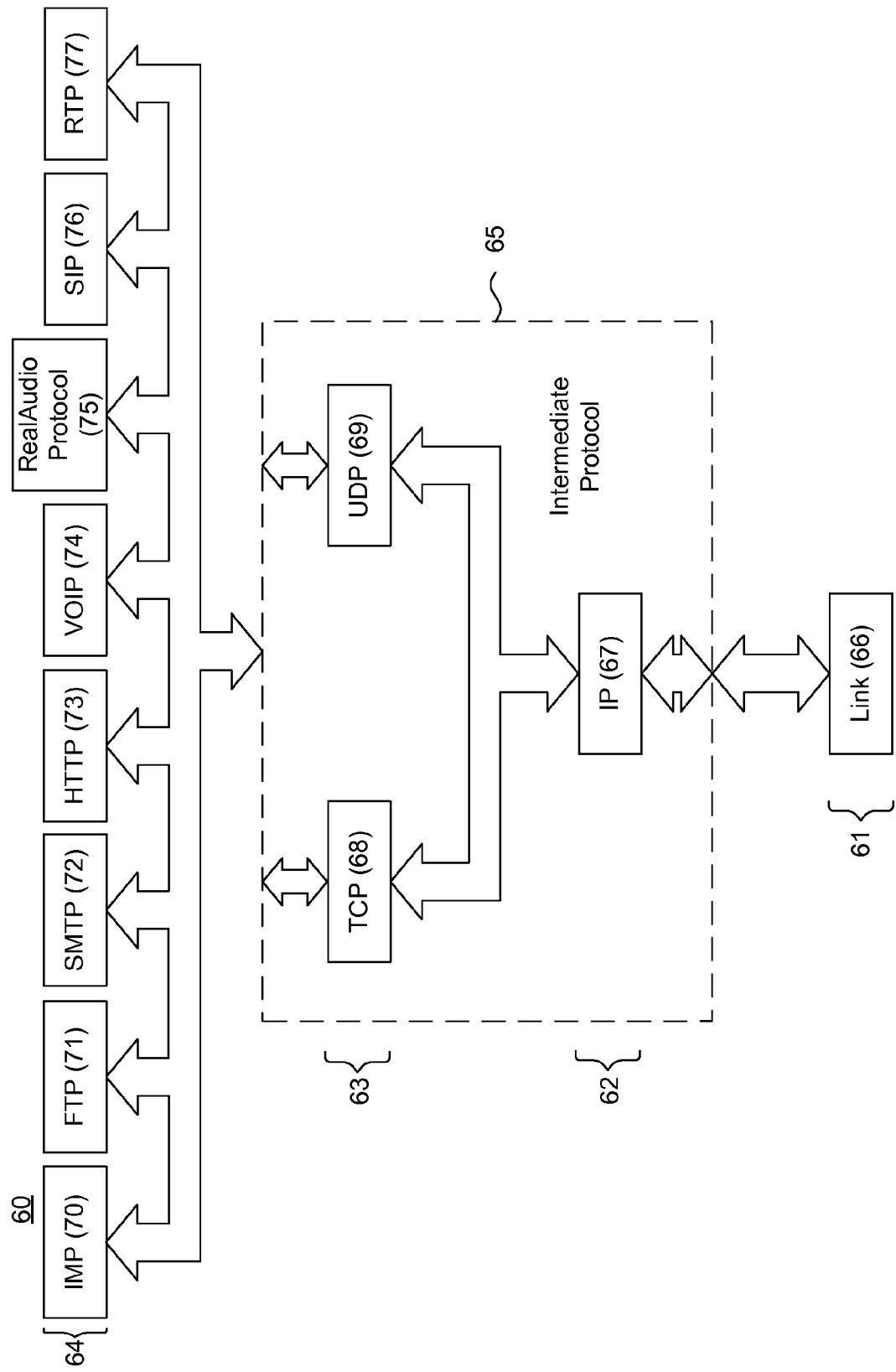
FIG. 3 is a block diagram showing, by way of example, heterogeneous protocol layers for use in the environment of FIG. 1.

To facilitate the conversion of messages between different messaging formats, each message is converted into an intermediate protocol format that is system-independent. FIG. 3 is a block diagram showing, by way of example, heterogeneous protocol layers 60 for use in the environment 10 of FIG. 1. The underlying network can be implemented in accordance with the Internet Protocol (IP), such as described in W. R. Stevens, "TCP/IP Illustrated," Vol. 1, Ch. 1 et seq., Addison-Wesley (1994), the disclosure of which is incorporated by reference. Other network infrastructures are possible. The intermediate protocol layer 65 logically overlays the network 62 and transport 63 layers of a standard network protocol stack implementation. Accordingly, the intermediate protocol 65 layer interfaces with yet transparent to the adjoining data link 61 and application 64 network protocol layers.

Messages are received into and sent out of the intermediate protocol layer 65 through a standard Internet Protocol (IP) interface 67. The corresponding data link interface 66 communicates with a media access controller to effect the physical transport of data packets to and from a destination network node. Similarly, the intermediate protocol layer 65 interfaces to applications through standard Transmission Control Protocol (TCP) 68 and User Datagram Protocol (UDP) 69 interfaces. The intermediate protocol layer 65 enables each message to be converted into an appropriate transport format for use by application protocol layer 64 programs. For instance, Internet Messaging Protocol (IMP) 70, File Transport Protocol 71 (FTP), Simple Mail Transport Protocol (SMTP) 72, and Hypertext Transport Protocol (HTTP) 73 messages are converted into TCP packets, whereas Voice over IP (VoIP) 74 and RealAudio Protocol 75 data streams are converted into UDP datagrams to respectively enable connection-oriented and connectionless communications, even where the original message is of a different messaging type.

In addition, the application protocol layer 64 can include support for interactive user sessions, such as Internet telephony, video, instant messaging, online gaming, and virtual reality. For example, the Session Initiated Protocol (SIP) 76 provides call setup and signaling and the Real-Time Transport Protocol (RTP) 77 provides streaming data support. SIP 76 can be used to assist with "morphing" conversations between formats. For instance, a conversation that began as a voice-to-voice exchange could be subsequently converted into a video-to-video exchange, provided that both parties switched to video. The switch to video would be effected through the shadowbox framework 26, which would create SIP connections for each party and make the necessary media and formatting conversions. Other application protocol layers and data conversions are possible.

Messaging Formats

Figure 4:
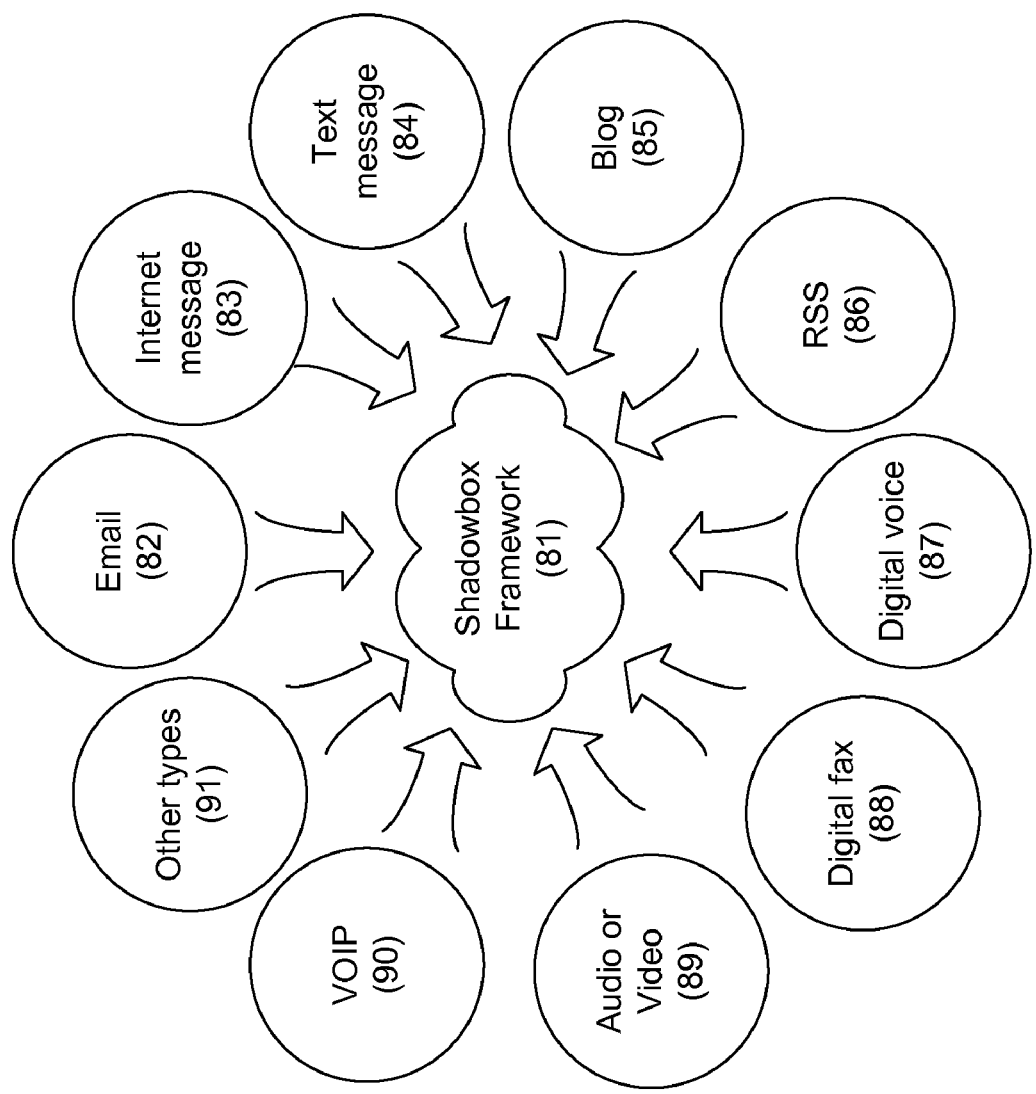
FIG. 4 is a data flow diagram showing, by way of example, heterogeneous electronic messaging formats used with the system of FIG. 2.

Messages can be exchanged freely between users and subscribers to shadowbox framework services through a number of supported messaging formats. FIG. 4 is a data flow diagram showing, by way of example, heterogeneous electronic messaging formats 80 used with the system 30 of FIG. 2. Messages are converted from and into the supported formats by the shadowbox framework 81. The formats include conventional email 82, such as POP3 and SMTP, as well as Internet messaging 83, text messaging 84, and Short Message Service (SMS) messaging. Email 82, Internet messaging 83 and text messaging 84 are examples of connectionless protocols identified through network addresses or handles. Conversely, connection-oriented protocols, such as HTTP, are supported through Blog 85 and RSS 86 message "formats," which rely on standard Web content hyperlinks identified through Uniform Resource Locators (URLs) operating in conjunction with active server content. Finally, legacy messaging formats, such as voice 87 and facsimile 88, identified through telephone numbers must be in a digital format. Similarly, streaming data, such as live audio or video 89 or voice over IP (VoIP) 90, can be provided through a connectionless protocol, such as the RealAudio Protocol. In a further embodiment, network addresses are handles, URLs, and telephone numbers can be represented by proxies. Other types of protocols 91 are supportable.

Micro Applications

Figure 5:
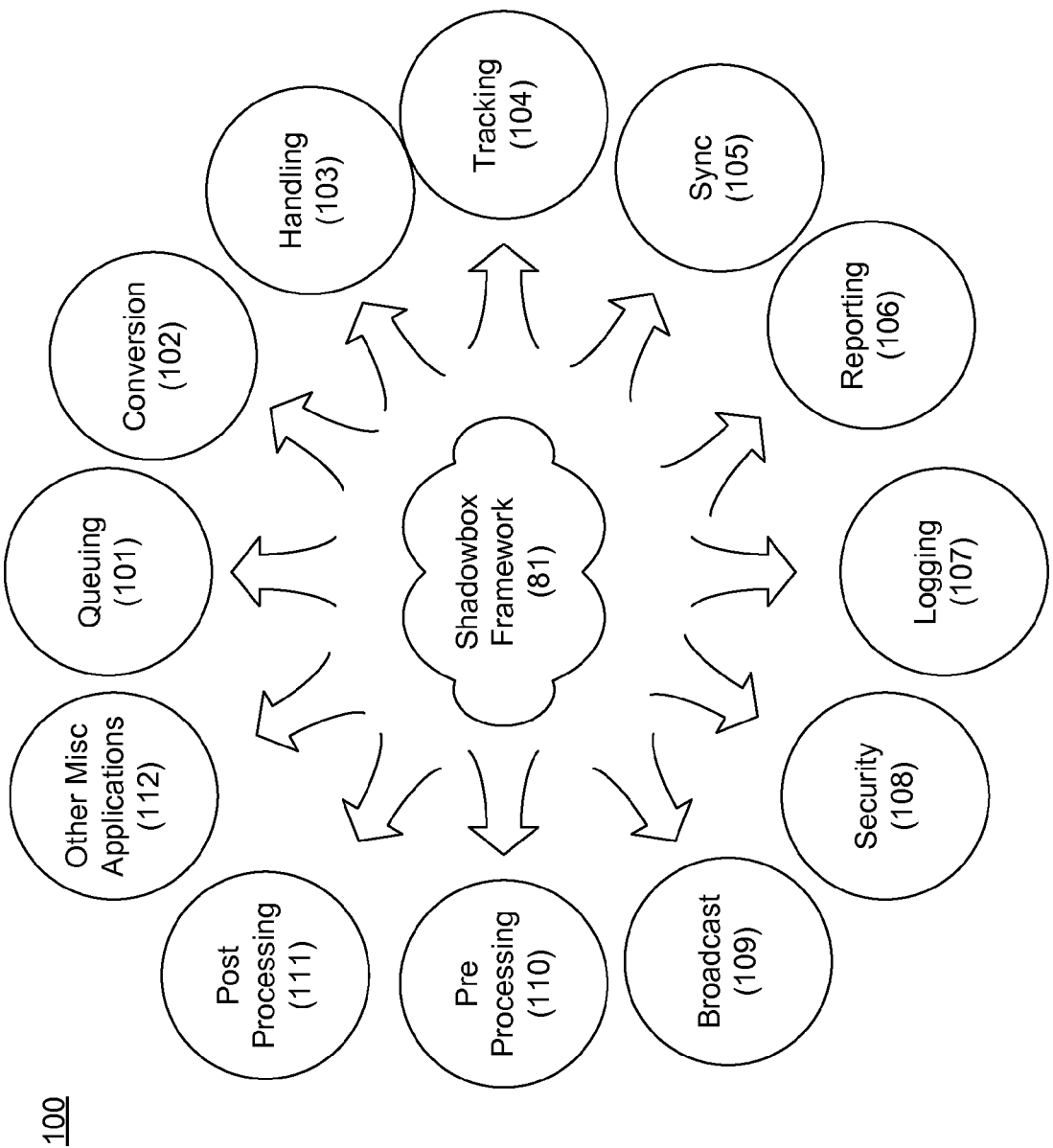
FIG. 5 is a data flow diagram showing, by way of example, micro applications used with the system of FIG. 2.

Functionality within the shadowbox framework can be customized through the use of micro applications. FIG. 5 is a data flow diagram showing, by way of example, micro applications 100 used with the system 30 of FIG. 2. The micro applications include both stand alone and plug-in programs. Other types of micro applications are possible.

Each micro application provides a specific type of service within the shadowbox framework 81. Fundamentally, queuing 101 temporarily stages pending and undelivered messages to provide a virtual desktop to users and subscribers. Conversion 102 translates messages into and from the intermediate protocol to enable system-independent message exchange. Some types of message translations require simple changes in form. For instance, converting an email into a Blog may only require posting the email header information and message body into a Web page format suitable for a Blog. On the other hand, converting a streaming audio message into a text message may require converting the audio stream from speech into text, then formatting the text into a series of one or more discrete text messages. Handling 103 allows a user to specify a set of handling rules 47 that enumerate alternate message delivery means. The handling rules 47 implement a message processing grammar that specifies how a message should be processed, for instance, should a message delivery attempt succeed, fail, or be preferred. The handling rules 103 can be executed sequentially or in tandem, and need not be followed in a linear order. For example, a user could specify that certain handling rules 103 be conditionally executed or skipped in order or out of sequence. Other forms of handling 103 are possible. Similarly, tracking 104 dynamically traces the progress of message delivery and active conversation threads. Synchronization 105 reflects substantive changes in a conversation thread independent of messaging format. For example, a reply to an email would be reflected and carried forward to subsequent messages in a conversation thread, even though those messages are in a format other than email, such as a Blog or facsimile.

In addition to tracking 104, the shadowbox framework 81 can also provide reporting 106 and logging 107, which respectively generate a summary of a conversation thread and archival of messages delivered. To ensure privacy, security 108 encrypts messages in the intermediate protocol layer 65 using, for instance, public key encryption. Although message exchange will frequently involve conversation threads between individual parties, a message can be broadcast 109 to a plurality of recipients, which can each have a different messaging format specified.

Finally, preceding or following message delivery, the shadowbox framework 81 can respectively support pre processing 110 and post processing 111, such as remote procedure execution through a compatible application provided, for instance, as a further micro application. Other miscellaneous micro applications 112 are possible.

Shadowbox Framework

Figure 6:
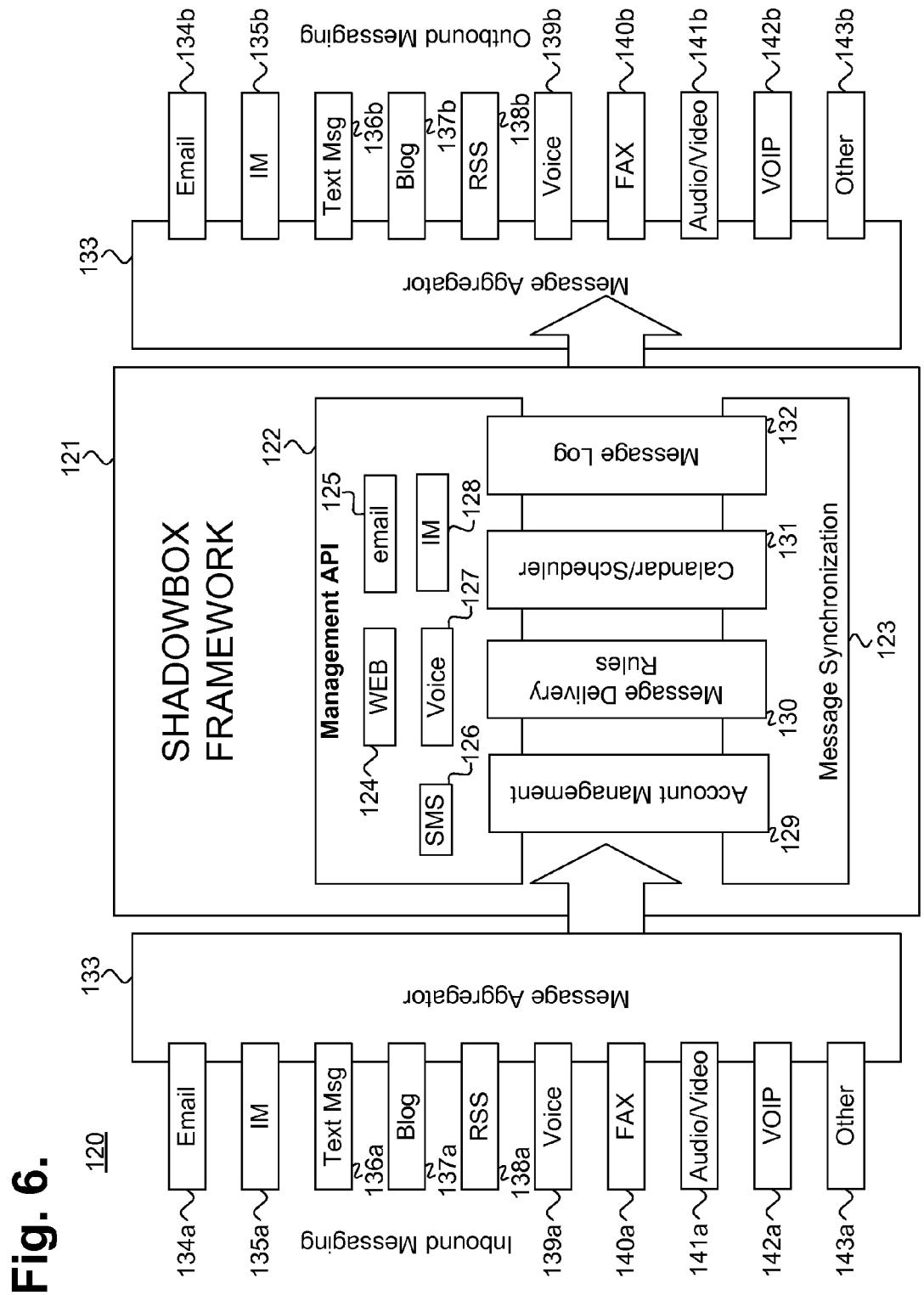
FIG. 6 is a functional block diagram showing software modules used in the shadowbox implemented in the system of FIG. 2.

The shadowbox framework provides a transparent message management and delivery mechanism that automatically selects, converts, and relays messages in plurality of messaging formats. FIG. 6 is a functional block diagram showing software modules 120 used in the shadowbox framework implemented in the system 30 of FIG. 2. The shadowbox framework 121 manages message receipt and delivery as a form of logical intermediate network layer between the data link and application network layers.

The shadowbox framework 121 interfaces to the data link network layer 61 through a message aggregator 133 and a set of message format-specific message interfaces 134a-143a and 134b-143b. Through each of the message interfaces, the message aggregator 133 converts an inbound or outbound message into an intermediate protocol representation that is used internally by the shadowbox framework 121. A set of micro applications 129-132 provides specialized functionality at the intermediate protocol layer and with the application network layer 64. A management API 122 enables end user applications, such as Web 124, email 125, SMS 126, voice 127, and Internet messaging 128, to access messages directly from the user or subscriber. Similarly, account management 129, message delivery rules 130, and message log 132 functions respectively allow a user to manage the shadowbox framework preferences, handling rules, and message archival conventions. Calendar and scheduler micro applications 131, for example, provide access to other forms of non-messaging data. Finally, message synchronization micro application 123 reflects message delivery progress, such as reply and forwarded messages, independent of messaging format. Other software modules are possible.

Message Processing

Figure 7:
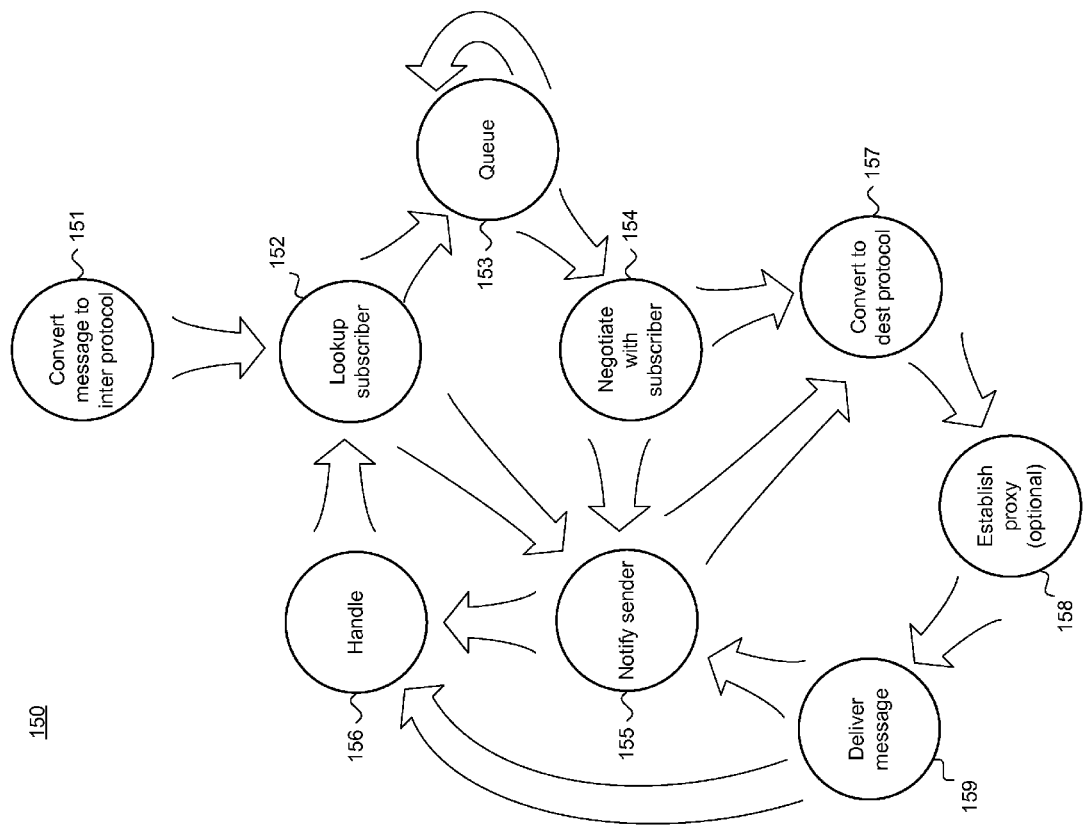
FIG. 7 is a process flow diagram showing message processing using the shadowbox of FIG. 6.

Message processing involves conversion, tracking, and delivery. FIG. 7 is a process flow diagram showing message processing 150 using the shadowbox framework 121 of FIG. 6. Initially, each message is converted into an intermediate protocol (operation 151). At a minimum, the intermediate protocol represents each message with a recipient identifier and content, although additional information can also be maintained depending upon the message type and delivery details.

Once received, the shadowbox framework 121 will look up a profile of the user or subscriber that is identified as the recipient of the message (operation 152) and the sender is notified (operation 155). The message is enqueued (operation 153). In addition, information about the conversation is determined, including the conversation link and contact status. The message is tagged with a conversation tag and archived before a contact sequence is built based on the user or subscriber profile. The shadowbox framework 121 can operate as a proxy for the user or subscriber, which will appear as a system-and messaging format-independent recipient. For example, a single telephone number can be used for digital voice or facsimile communications and a single email or network address or handle for other forms of addressable data.

The shadowbox framework 121 negotiates with the subscriber (operation 154) when required to transact a message delivery. For instance, negotiation is necessary for session-based communications, such as a Blog, RSS, audio or video streaming data delivery. Upon the successful completion of subscriber negotiation, the message is converted into the negotiated destination protocol (operation 157). A proxy for the subscriber can optionally be established (operation 158). The message is then delivered (operation 159). If subscriber negotiation fails or the delivery attempt times out, the sender is notified (operation 155). The sender is notified following successful message delivery (operation 155). However, if message delivery fails, the sender is notified (operation 155) and the delivery is handled (operation 156) by selecting the next handling rule and specifying an alternate messaging format. Other operations are possible.

Original Message

Figure 8:
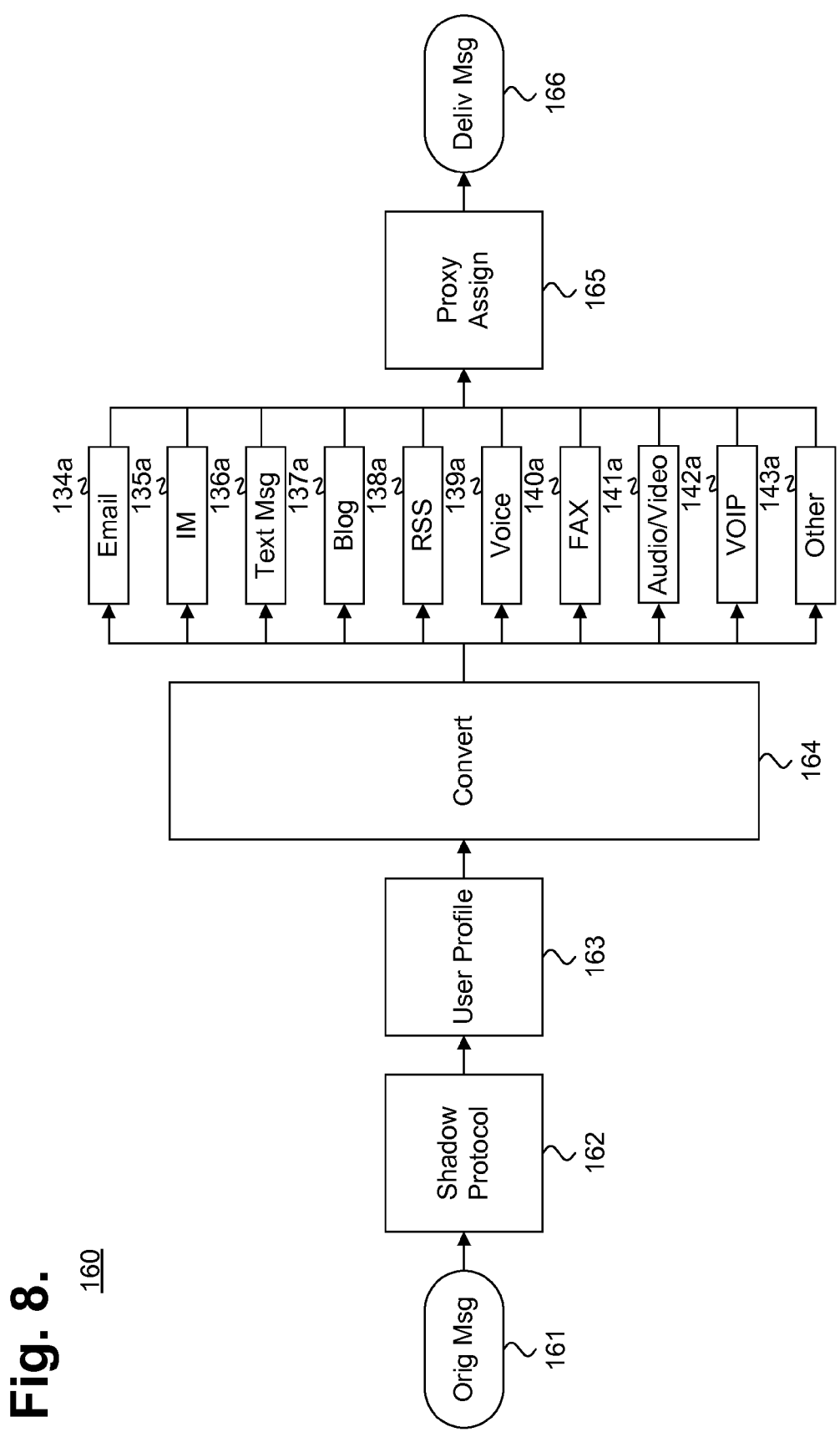
FIG. 8 is a process flow diagram showing processing for an original message using the shadowbox of FIG. 6.

A user generally refers to the sender of a message while a subscriber generally refers to a message recipient who is enrolled in services offered by a shadowbox framework. FIG. 8 is a process flow diagram showing processing 160 for an original message using the shadowbox framework 121 of FIG. 6. An original message 161 is received and converted into the intermediate protocol used by the shadowbox framework 121 (operation 162). If available, the profile for the user is retrieved (operation 163) and the original message 161 is converted (operation 164) using an appropriate conversion message interface 134a-142a. A communication proxy is assigned (block 165) and the message is queued for delivery (operation 166). Other original message processing operations are possible.

Reply Message

Figure 9:
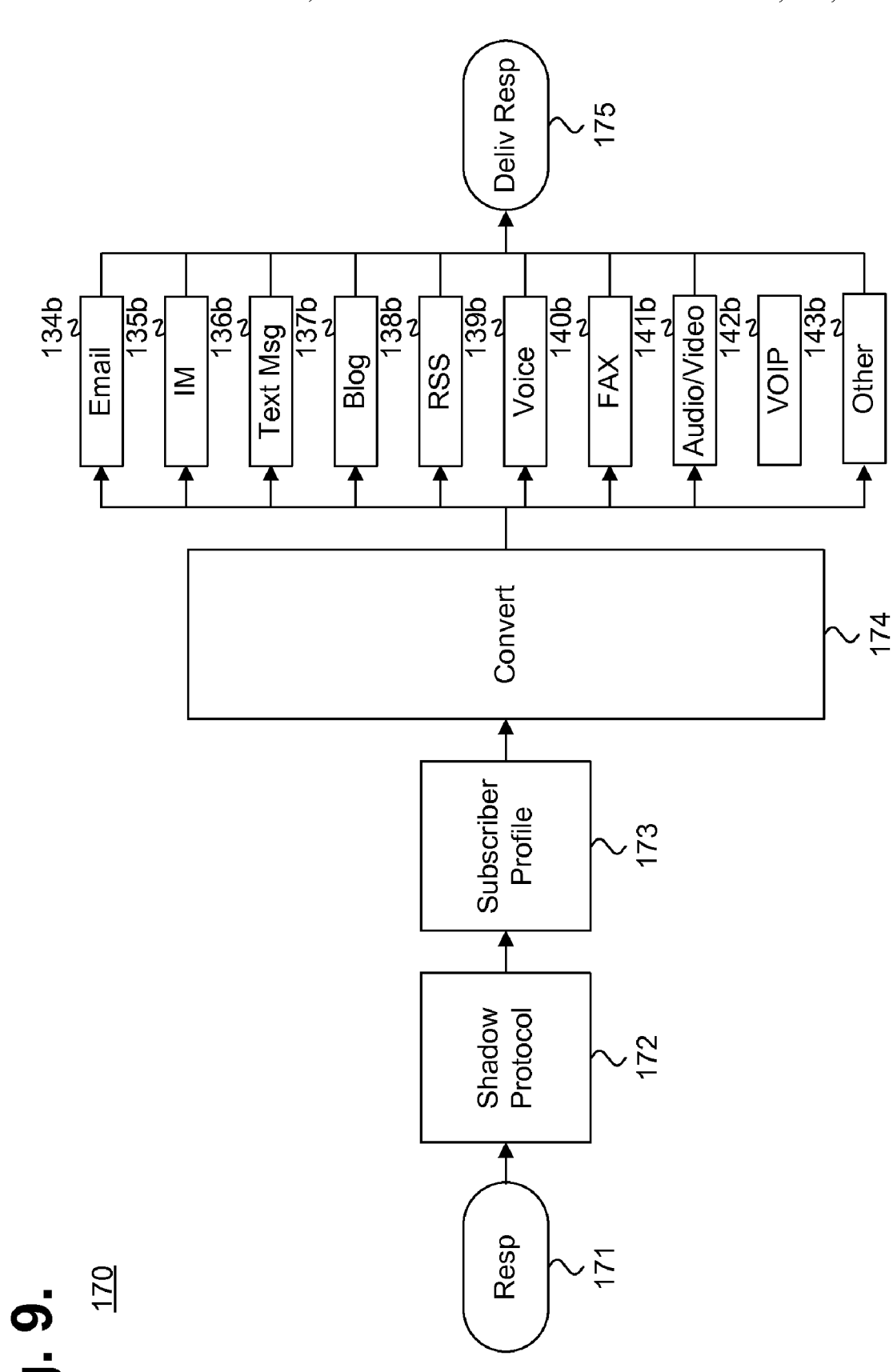
FIG. 9 is a process flow diagram showing processing for a reply message using the shadowbox of FIG. 6.

A subscriber generally has a set of handling rules in place that specify alternate means of message delivery, should a communications device or messaging channel be unavailable or unsuccessful, or simply preferred. FIG. 9 is a process flow diagram showing processing 170 for a reply message using the shadowbox framework 121 of FIG. 6. A response message 171 received from a subscriber is converted into the intermediate protocol used by the shadowbox framework 121 (operation 172). The profile for the subscriber is looked up (operation 173) and the response message 171 is converted (operation 174) into a specific messaging format for the recipient user using the corresponding message interface 134b-142b. The response message 171 is then delivered (operation 175). Other reply message processing operations are possible.

Inbound Text Message

Figure 10A:
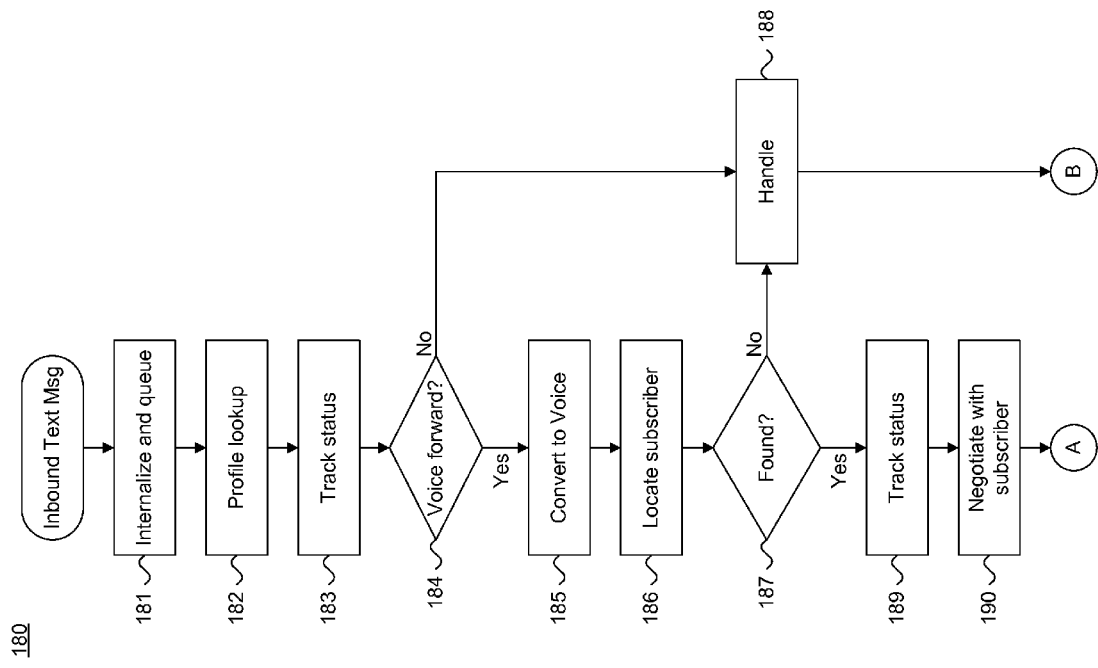
FIGS. 10A-C are flow diagrams showing inbound text message processing.
Figure 10B:
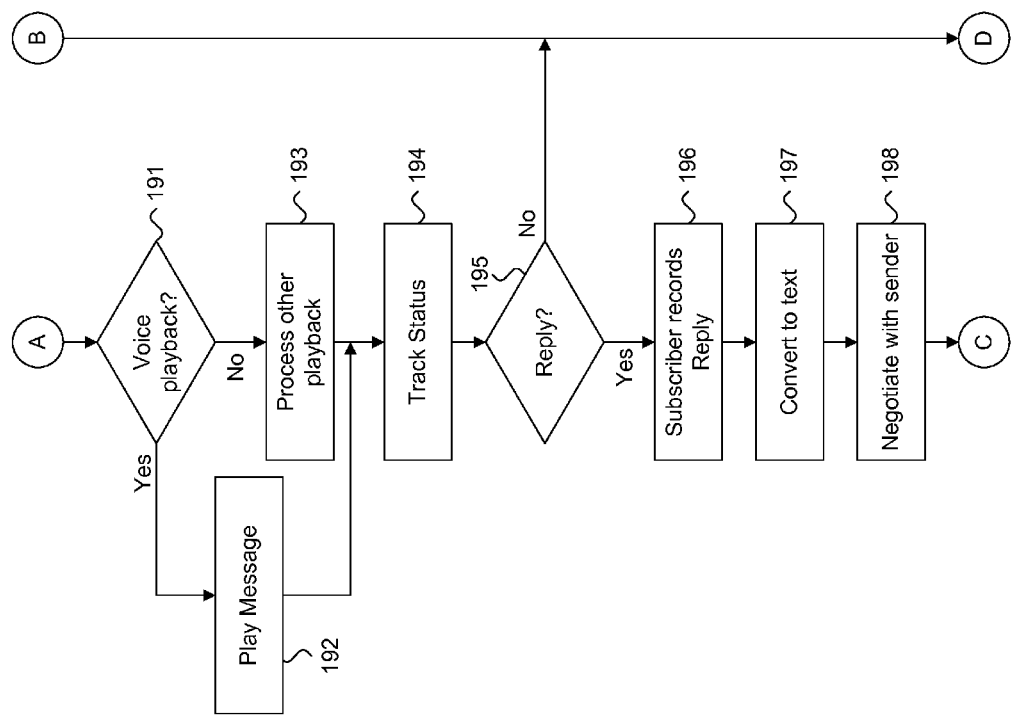
Figure 10C:
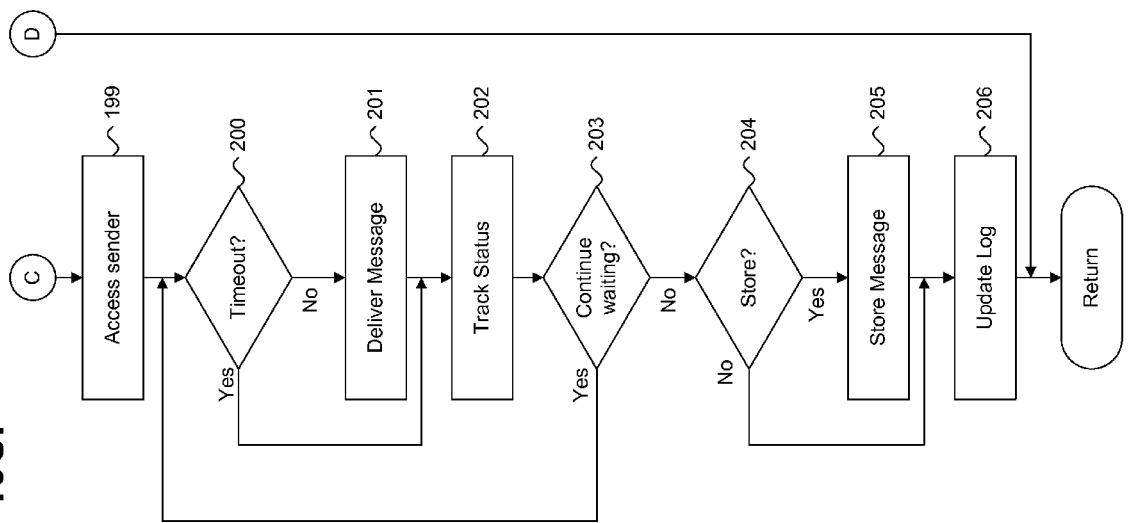

The type of processing performed depends upon the formats used by the original and delivered messages. FIGS. 10A-C are flow diagrams showing inbound text message processing 180. For example, an inbound text message can be delivered as a digital voice message for playback as streaming audio data.

Initially, the inbound text message is internalized by conversion into the intermediate format and queued (block 181). The profile for the sending user is looked up (block 182) and tracking of the message delivery status is started (block 183). If the message cannot be forwarded as a digital voice message (block 184), the delivery is handled (block 188) by applying the next applicable handling rule. Otherwise, the inbound text message is converted from the intermediate format into a digital voice message (block 185) and the recipient subscriber is located (block 186). If the recipient subscriber is not found (block 187), the message delivery is handled (block 188). Otherwise, the tracking status of the message delivery is updated (block 189) and message delivery is negotiated with the recipient subscriber (block 190). If the subscriber can receive voice playback (block 191), the message is played as streaming audio data (block 192). Otherwise, other forms of playback are processed (block 193), for instance, as a form of scrolling text message. The tracking status is again updated (block 194). If the recipient subscriber chooses to reply (block 195), a reply message from the recipient subscriber is recorded (block 196). The reply message is converted into a text message (block 197) and delivery with the sending user is negotiated (block 198). The sender is accessed (block 199) and, provided a timeout does not occur (block 200), the message is delivered (block 201). The tracking status is again updated (block 200). If delivery is pending, the shadowbox framework continues waiting (block 203). Finally, if the user profile indicates message storage (block 204), the message is stored (block 205) and the log 49 is updated (block 206).

Proxied Telephone Message

Figure 11:
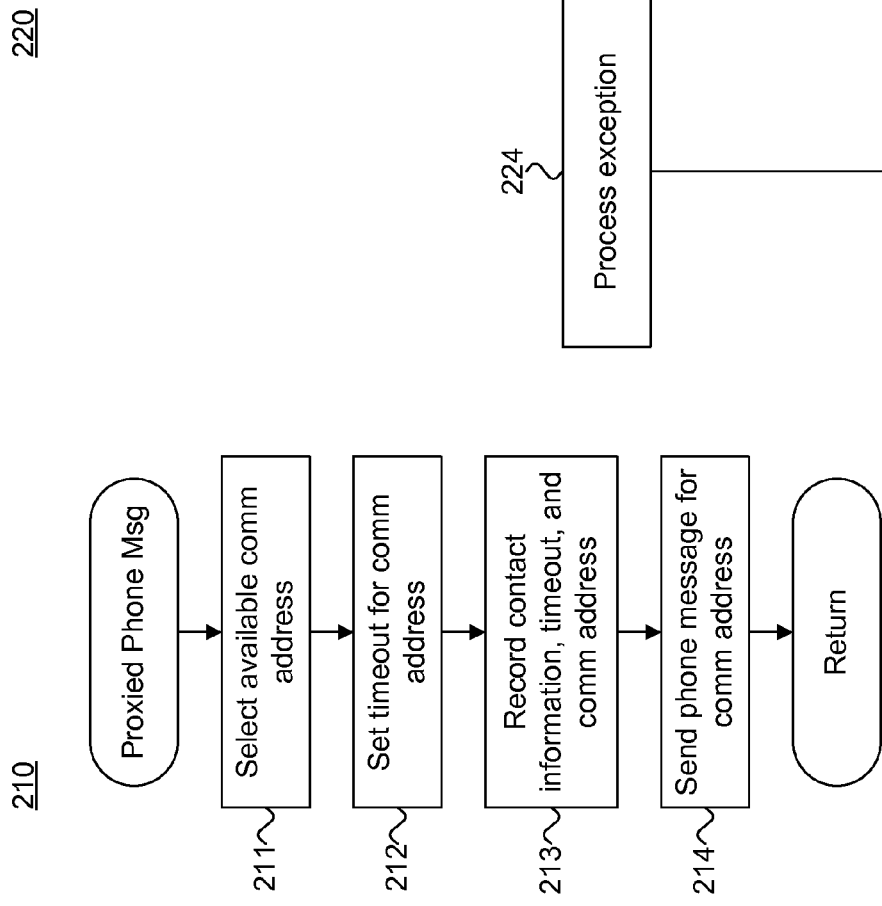
FIG. 11 is a flow diagram showing proxied telephone message processing.

In a further embodiment, telephone messages can be proxied by assigning a system-independent network or communication address for the purpose of a particular conversation thread, user, or subscriber. FIG. 11 is a flow diagram showing proxied telephone message processing 210. Initially, an available communication address is selected (block 211) and a timeout value is set (block 212). The contact information, timeout value, and communication address are recorded (block 213) and the telephone message is sent to the communication address (block 214).

Proxied Telephoned Message

Figure 12:
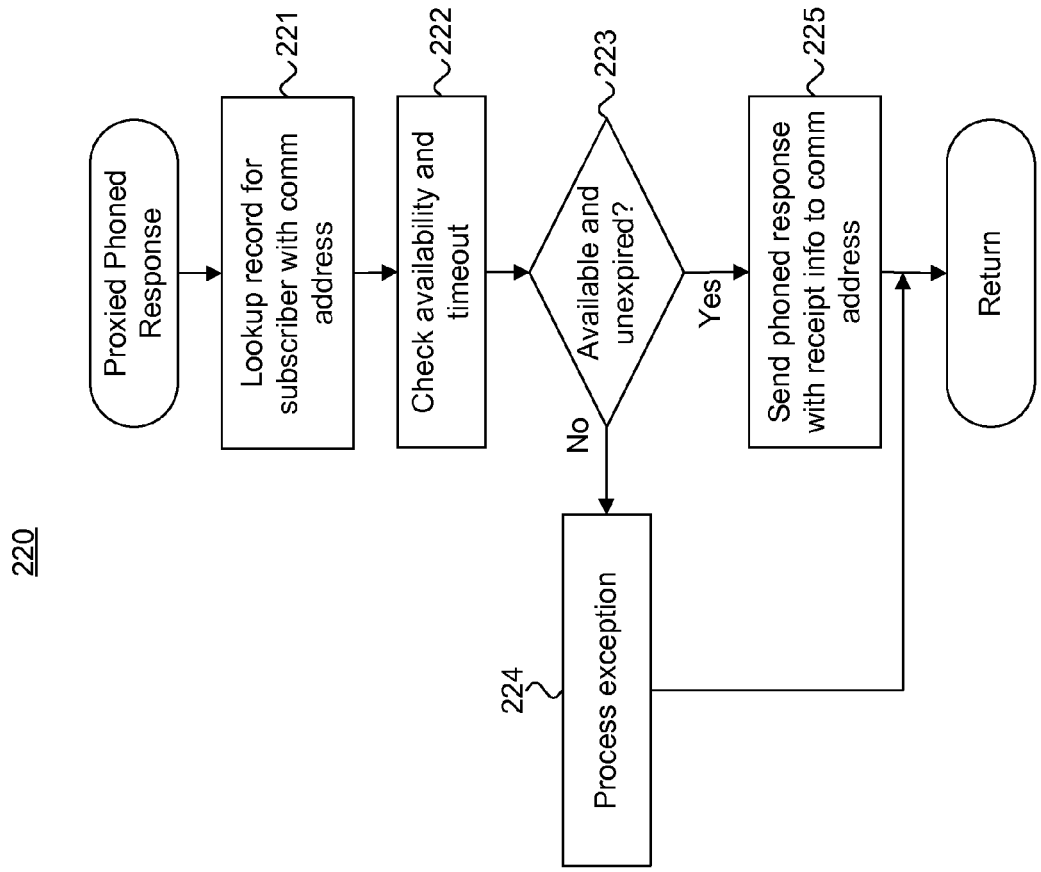
FIG. 12 is a flow diagram showing proxied telephoned message processing.

Similarly, a telephone response can be proxied on behalf of a recipient subscriber. FIG. 12 is a flow diagram showing proxied telephoned message processing 220. Initially, the record for the subscriber is looked up using the communication address for the telephone conversation (block 221) and the availability and timeout values are checked (block 222). If the communication address is still available and the timeout unexpired (block 223), the telephone response is sent with received information returned to the communication address (block 225). Otherwise, an exception is processed (block 224).

RSS Notification

Figure 13:
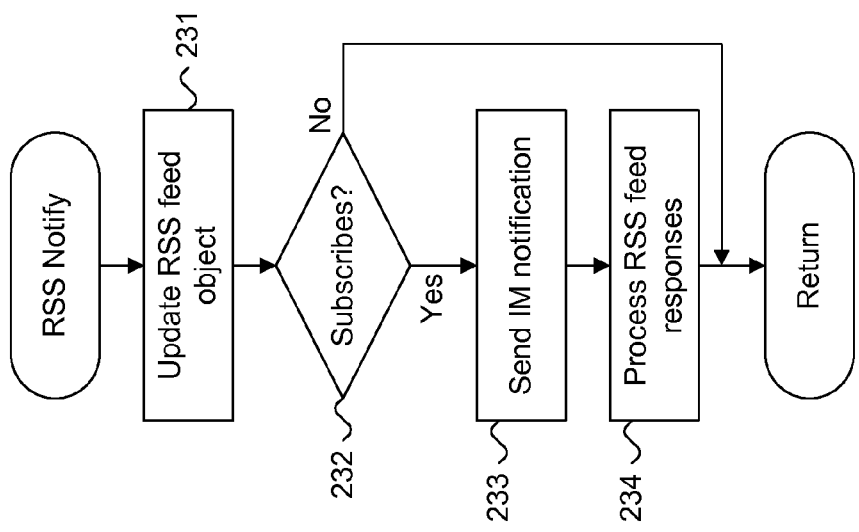
FIG. 13 is a flow diagram showing RSS notification processing.

In a still further embodiment, messages can be sent as a form of RSS feed by notifying the recipient subscriber. FIG. 13 is a flow diagram showing RSS notification processing 230. Conventionally, an RSS feed relies on polling performed by the RSS subscriber to determine when an update to the feed is available. However, to conserve network resources and lower network traffic volume, an RSS subscription server can provide notifications to subscribers. Initially, the RSS feed object is updated (block 231) and, if users are subscribing to the RSS feed (block 232), an Internet messaging notification is sent (block 233). An appropriate RSS feed response is then processed (block 234) based on the messaging format specified by the subscriber.

Inbound Voice Communication

Figure 14A:
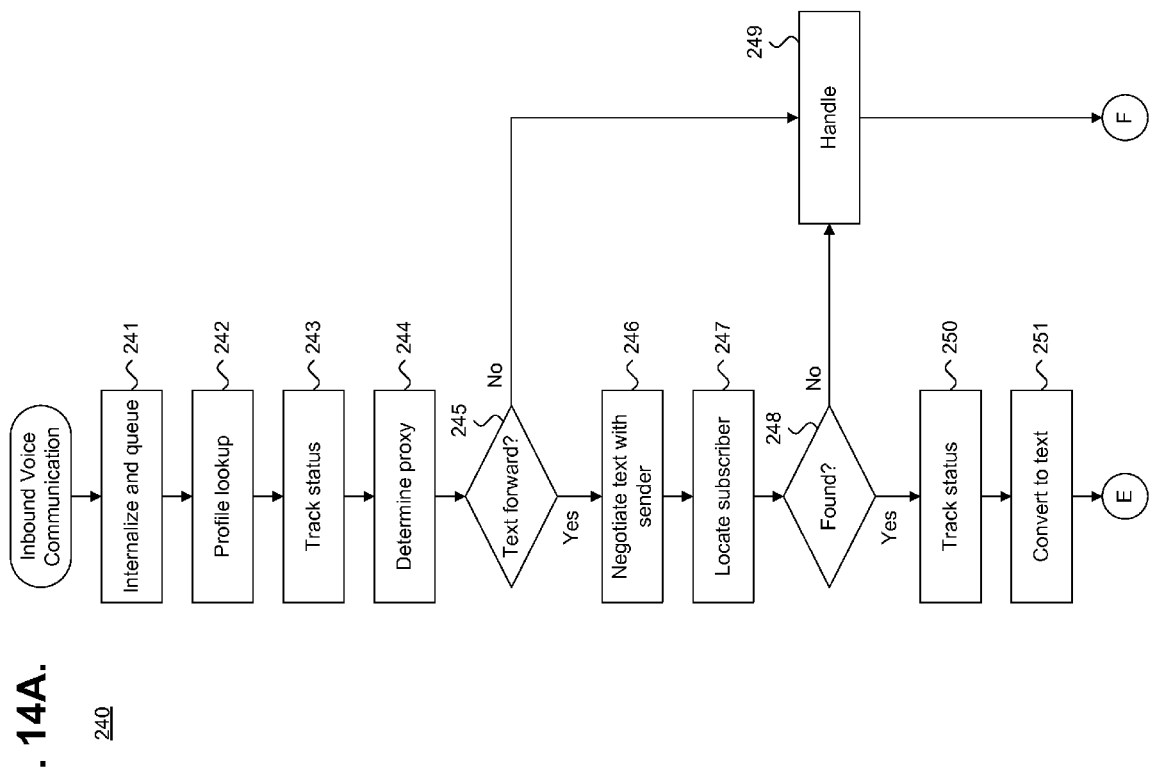
FIGS. 14A-B are flow diagrams showing inbound voice communication processing.
Figure 14B:
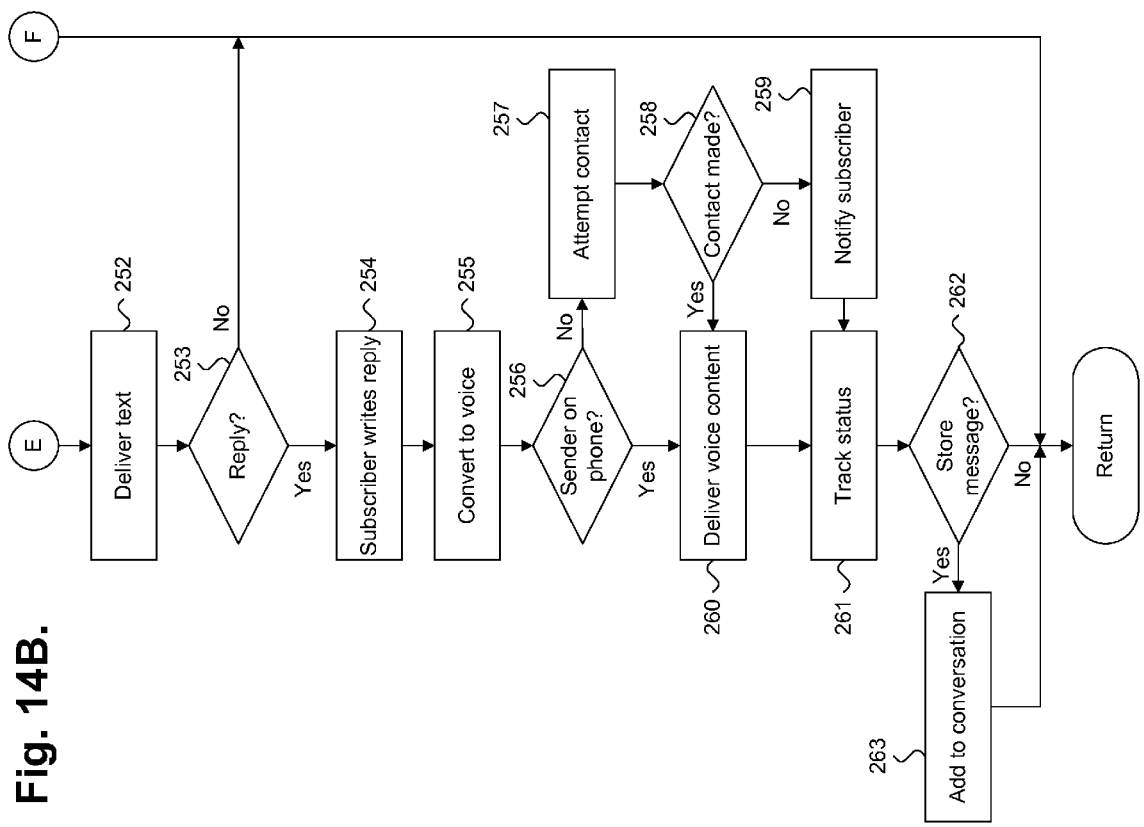

In a still further embodiment, voice communications can be exchanged between subscribers. FIGS. 14A-B are flow diagrams showing inbound voice communication processing 240. For example, an inbound voice communication can be delivered as a text message.

Initially, the inbound text message is internalized by conversion into the intermediate format and queued (block 241). The profile for the sending user is looked up (block 242) and tracking of the message delivery status is started (block 243). A proxy is determined by assigning a system-independent network or communication address (block 244). If the message cannot be forwarded as a text message (block 245), the delivery is handled (block 249) by applying the next applicable handling rule. Otherwise, message delivery is negotiated with the sender (block 246) and the recipient subscriber is located (block 247). If the recipient subscriber is found (block 248), the tracking status is again updated (block 250) and the voice communication is converted from the intermediate format into a text message (block 251). The text message is then delivered (block 252). Otherwise, if the recipient subscriber is not found (block 248), the message delivery is handled (block 249).

A recipient subscriber can chose to reply (block 253) by first writing a reply message (block 254), which is converted into a voice communication (block 255). If the sender is on the telephone (block 256), the reply is delivered as voice content (block 260). Otherwise, the shadowbox framework will attempt contact (block 257) until contact is made (block 258). If attempts at contacting the sender fail (block 259), the recipient subscriber is notified (block 259). The tracking status is again updated (block 261). Finally, if the user profile indicates message storage (block 262), the message is stored (block 263).

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented system for facilitating conversation within a group through heterogeneous message delivery, comprising:
a database comprising a conversation thread comprising a plurality of messages that are identified and shared by a plurality of recipients who are collectively formed into a group;
a queue to temporarily queue, for each recipient in the group, the messages from one such recipient in an intermediate format pending delivery through type-specific message interfaces to each of the other recipients of the conversation thread;
a shadowbox framework to manage the delivery of each message within the group, comprising:
a conversion module to determine a message type corresponding to each of the other recipients, and to format an identifier and structure the content of each message from the intermediate format into the message type for each of the other recipients;
a message aggregator to send the message to each of the other recipients via the message interface corresponding to the message type of the other such recipient;
a tracking module to track the delivery of the message by monitoring an acknowledgement of a receipt of the message by the other such recipient; and
a handling module to select an alternate message type upon non-acknowledgment of message receipt by the other such recipient.

2. A system according to claim 1, further comprising:
an application to broadcast one or more of the messages in the conversation thread to all of the recipients in the group,
wherein the tracking module is further comprised to confirm the delivery of the one or messages, comprising one of:
a broadcast module to broadcast one of the acknowledgement and the non-acknowledgement of the message to all of the recipients; and
an acknowledgement module to send one of the acknowledgement and the non-acknowledgement of the message to the recipient that originated each such message.

3. A system according to claim 1, wherein one or more of the messages in the conversation thread are sent to less than all of the recipients in the group, and the tracking module is further comprised to confirm the delivery of the one or messages, comprising one of:
a broadcast module to broadcast one of the acknowledgement and the non-acknowledgement of the message to all of the recipients; and
an acknowledgement module to send one of the acknowledgement and the non-acknowledgement of the message to the recipient that originated each such message.

4. A system according to claim 1, further comprising:
a set of handling rules that specify an order of selection of the alternate message type, wherein the alternate message type is limited to only those message types corresponding to the messages comprised in the conversation thread.

5. A system according to claim 1, wherein those of the recipients in the group sharing a same message type are determined, and the identifier and the content of the messages exchanged between those recipients are maintained in lieu of the intermediate format.

6. A system according to claim 1, further wherein the message is encrypted during the delivery.

7. A system according to claim 1, wherein at least one such message type comprises a connection-oriented network protocol message, further comprising a connection-oriented network interface to open a data exchange session with the recipient, deliver the message to the recipient by transacting the data exchange session, and close the data exchange session to provide the receipt acknowledgement of the delivered message.

8. A system according to claim 1, wherein at least one such message type comprises a connectionless network protocol message, further comprising a connectionless network interface to communicate the message to the recipient, and to await one of an express acknowledgement and time out to provide the receipt acknowledgement of the delivered message.

9. A system according to claim 1, wherein intermediate format comprises a logical overlay to transport and network protocol layers within a network infrastructure.

10. A system according to claim 1, wherein the network infrastructure is TCP/IP-compliant.

11. A computer-implemented system for facilitating conversation within a group through heterogeneous message delivery, comprising:

a database configured to store a conversation thread comprising a plurality of messages that are identified and shared by a plurality of recipients who are collectively formed into a group;

a queue configured to temporarily queue, for each recipient in the group, the messages from one such recipient in an intermediate format pending delivery through type-specific message interfaces to each of the other recipients of the conversation thread;

a shadowbox framework configured to manage the delivery of each message within the group, comprising:

a conversion module configured to determine a message type corresponding to each of the other recipients, and to format an identifier and structure the content of each message from the intermediate format into the message type for each of the other recipients;

a message aggregator configured to send the message to each of the other recipients via the message interface corresponding to the message type of the other such recipient;

a tracking module configured to track the delivery of the message by monitoring an acknowledgement of a receipt of the message by the other such recipient; and a handling module configured to select an alternate message type upon non-acknowledgment of message receipt by the other such recipient.

12. A system according to claim 11, further comprising:

an application configured to broadcast one or more of the messages in the conversation thread to all of the recipients in the group; and the tracking module further comprised to confirm the delivery of the one or messages, comprising one of:

a broadcast module configured to broadcast one of the acknowledgement and the non-acknowledgement of the message to all of the recipients; and an acknowledgement module configured to send one of the acknowledgement and the non-acknowledgement of the message to the recipient that originated each such message.

13. A system according to claim 11, wherein one or more of the messages in the conversation thread are sent to less than all of the recipients in the group, and the tracking module is further comprised to confirm the delivery of the one or messages, comprising one of:

a broadcast module configured to broadcast one of the acknowledgement and the non-acknowledgement of the message to all of the recipients; and an acknowledgement module configured to send one of the acknowledgement and the non-acknowledgement of the message to the recipient that originated each such message.

14. A system according to claim 11, further comprising:

the database further configured to store a set of handling rules that specify an order of selection of the alternate message type, wherein the alternate message type is limited to only those message types corresponding to the messages comprised in the conversation thread.

15. A system according to claim 11, wherein those of the recipients in the group sharing a same message type are determined, and the identifier and the content of the messages exchanged between those recipients are maintained in lieu of the intermediate format.

16. A system according to claim 11, further wherein the message is encrypted during the delivery.

17. A system according to claim 11, wherein at least one such message type comprises a connection-oriented network protocol message, further comprising:

a connection-oriented network interface configured to open a data exchange session with the recipient, deliver the message to the recipient by transacting the data exchange session, and close the data exchange session to provide the receipt acknowledgement of the delivered message.

18. A system according to claim 11, wherein at least one such message type comprises a connectionless network protocol message, further comprising:

a connectionless network interface configured to communicate the message to the recipient, and to await one of an express acknowledgement and time out to provide the receipt acknowledgement of the delivered message.

19. A system according to claim 11, wherein intermediate format comprises a logical overlay to transport and network protocol layers within a network infrastructure.

20. A system according to claim 11, wherein the network infrastructure is TCP/IP-compliant.

\* \* \* \* \*